Dec. 7, 1954  F. J. LOZOWSKI  2,696,598
HORN ACTUATED SIGNAL LIGHT
Filed Oct. 3, 1950
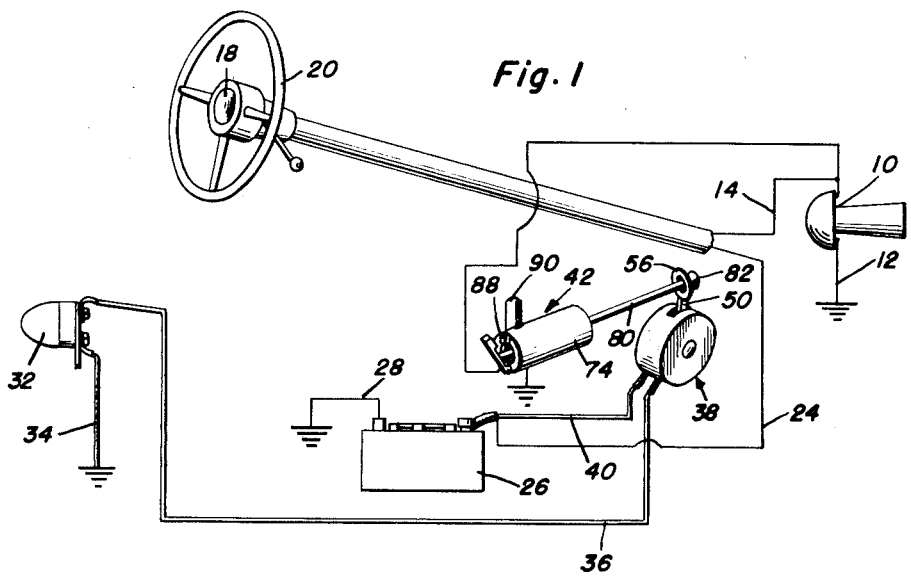
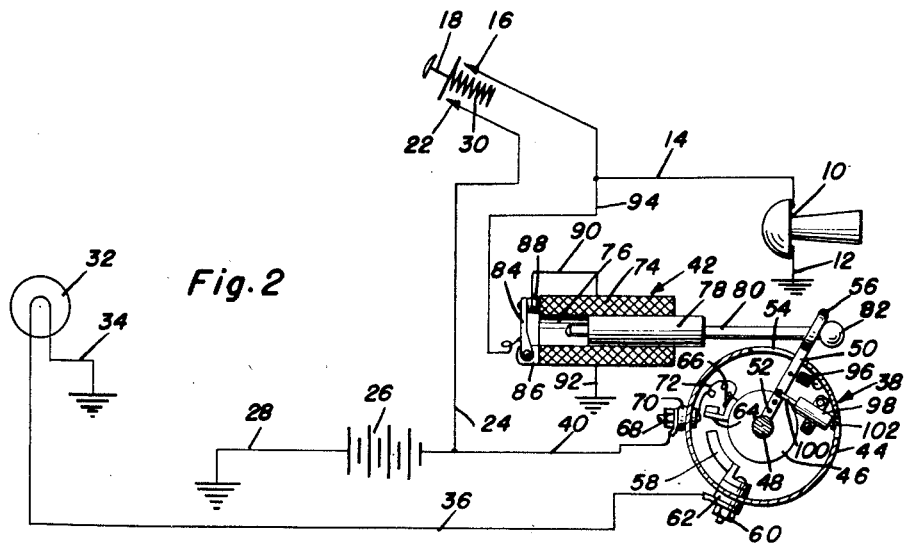
Francis J. Lozowski
INVENTOR.

united States Patent Office 2,696,598
Patented Dec. 7, 1954

2,696,598

HORN ACTUATED SIGNAL LIGHT

Francis J. Lozowski, Utica, N. Y., assignor of one-half to Louis J. Mazzatti, Utica, N. Y.

Application October 3, 1950, Serial No. 188,156

1 Claim. (Cl. 340—75)

This invention comprises novel and useful improvements in signalling devices and more particularly pertains to a device for automatically actuating a visually perceptive signal in response to actuation of the automobile horn.

An important object of this invention is to provide a visual signal for warning motorists behind when a driver has actuated his horn, which signal will remain actuated for a predetermined period of time substantially independent of the duration of the actuation of the horn.

Another important object of this invention is to provide a visually perceptive signal for warning a motorist behind when a driver has actuated his horn, which signal device is actuated in response to actuation of the horn; which signal device does not require a change in construction of the horn actuator; and which device is generally of simple and efficient construction.

An important feature of this invention resides in the provision of a signal with a switch for actuating the signal, together with a mechanism responsive to the actuation of the horn for selectively actuating the signal switch.

Another important feature of this invention resides in the provision of a visual signal, a switch for actuating the signal, together with a mechanism responsive to the actuation of the automobile horn for selectively actuating the signal, with a time delay mechanism for regulating the duration of the actuation of the signal switch.

These, together with various ancillary objects and features are attained by this device, a preferred embodiment of which has been illustrated by way of example only in the accompanying drawings wherein:

Figure 1 is a diagrammatic view of the wiring for the horn actuated visual signal with parts thereof shown in elevation; and Figure 2 is a diagrammatic view of the wiring for the horn actuated visual signal, with parts being shown in section to illustrate details of construction.

It is well known to drivers that when a motorist actuates the automobile horn that it customarily indicates that the road ahead of the motorist is not clear for driving and that it may necessitate that the motorist either stop, slow down or swerve to avoid an obstacle disposed in the path of travel. However, since it is often difficult to hear the horn of a vehicle ahead, and also difficult to ascertain which, of a plurality of vehicles, did actuate their horn, it will be appreciated that a motorist will not be adequately appraised of when a driver ahead actuates his horn, and consequently not appraised of the possible change in speed or direction of the vehicle ahead. It is accordingly a desideratum of this invention to provide a visual signal which is actuated for a predetermined time interval, in response to actuation of the horn.

Reference is now made more specifically to the accompanying drawings wherein like numerals designate similar parts throughout the various views.

A horn 10 is electrically connected to a ground by a conductor 12, the horn being otherwise electrically connected by a conductor 14 to one of the contact terminals 16 of a horn switch 18 which is customarily mounted on the steering wheel 20 of a vehicle. The other terminal 22 of the horn 18 is connected by a conductor 24 to a source of power 26 which may be a battery or the like, the source of power being otherwise connected to ground by a conductor 28. As will be appreciated, the horn switch 18 is normally biased out of engagement with the terminals 16 and 22 by a spring 30 whereby the horn switch is actuated by application of pressure thereto.

A visually perceptive signal 32 which is preferably mounted on the rear of a vehicle is provided, the signal 32 being electrically connected to ground by a conductor 34, the signal being otherwise electrically connected by a conductor 36 to a signal switch 38, which signal switch is otherwise electrically connected by a conductor 40 to the source of power 26. The signal switch 38 is operatively connected to a switch actuator 42 which is adapted to be actuated in response to actuation of the horn switch 18.

The signal switch 38 includes a casing 44 and a hub 46 of electrically insulating material which is non-rotably mounted on a shaft 48 which is journaled in the side walls of the casing 44. An arm 50 has one end thereof secured to the hub 46 as by fasteners 52, the arms extending through a slot 54 in the casing 44 and terminating in an eye 56.

An arcuate contact bar 58 is attached to the casing 44 by a fastener 60, to which the conductor 36 is also connected, the bar 58 being disposed concentric with the shaft 48, the bar 58 and fastener 60 being electrically insulated from the casing 44 by washers 62. A switch finger 64 is secured to the hub 46 by a fastener 66 for movement therewith. A contact post 68 is carried by the casing and electrically insulated therefrom by washers 70, the post 68 being connected by a flexible conductor 72 to the finger 66. It is to be understood, however, that other means could be provided for connecting the finger 64 to the post 68 without departing from the scope of this invention. It will thus be appreciated that as the arm 50 and consequently the finger 64 is rotated, that the finger 64 will be in sliding electrical contact with the bar 58.

The switch actuator 42 includes a solenoid 74 having an axial bore 76 therein, a plunger 78 of magnetically permeable material is slidably disposed in the bore 76, the plunger having a rod 80 thereon which extends through the eye 56, a head 82 being formed on the end of the rod to limit relative movement of the rod and the switch arm 50. As will be appreciated, the solenoid 74 and the plunger 78 may be arcurately formed and disposed concentric with the shaft 48.

A solenoid switch 84 is pivotally attached to the ears 86 extending from the end of the solenoid 74, the switch extending across the bore 76 and in the path of movement of the plunger 78. The switch is normally urged to its closed position by a spring (not shown) into engagement with a terminal 88 carried by the solenoid 74 and electrically insulated therefrom. The terminal 88 is connected by a conductor 90 to the solenoid, the solenoid being otherwise connected to ground by a conductor 92. The switch 84 is connected by conductor 94 to the terminal 16 of the horn switch.

The switch arm 50 is normally biased to its open position by spring 96. In order to regulate the rate of switch opening movement of the arm 50, there is provided a dashpot 98 which is carried by the casing 44 and operatively connected by a rod 100 to the arm 50.

In operation, the horn switch 18 is actuated thereby energizing the horn 10 and simultaneously energizing the solenoid 74 through the normally closed switch 84. The plunger 78 is then urged in a direction to pivot the arm 50 and finger 64 into circuit closing position thereby energizing the signal 32 which warns motorists behind when the driver has actuated his horn. The plunger 78 then engages the switch 84 to thereby open the solenoid circuit and deenergize the solenoid, the spring 96 then yieldingly urging the finger 64 to its open position, the rate of opening being regulated by the dashpot 98. As is conventional, a screw 102 is carried by the dashpot 98 to regulate the flow of fluid therefrom.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

In a vehicle including a horn, a source of power and a horn switch electrically connected to the source of power and the horn for selectively making and breaking a circuit to the horn, a signal light mounted on the rear of the vehicle, a second switch electrically connected to the source of power and to the signal light, said second switch including a stationary contact, a rotatable member and another contact supported by the member and removable toward and away from said stationary contact, a solenoid including an operating core connected to the rotatable member for rotating said member to move the contact supported by the member into circuit closing engagement with the stationary contact, and a spring yieldingly urging the member to a position spacing the contact supported by the member from the stationary contact, and a dashpot connected to the member and delaying rotation of said member in response to action of said spring, whereby the lamp may remain energized after the horn switch is moved to its circuit open position.

References Cited in the file of this patent

UNITED STATES PATENTS

| Number | Name | Date |
|---|---|---|
| 1,200,460 | Booraem | Oct. 10, 1916 |
| 1,469,337 | Sanborn | Oct. 2, 1923 |
| 1,893,371 | Knowlton | Jan. 3, 1933 |
| 2,300,571 | Horton et al. | Nov. 3, 1942 |
| 2,317,713 | Aufiero | Apr. 27, 1943 |
| 2,572,815 | La Porte | Oct. 23, 1951 |

FOREIGN PATENTS

| Number | Country | Date |
|---|---|---|
| 429,876 | Great Britain | June 7, 1935 |